United States Patent
Lee et al.

(10) Patent No.: US 7,641,722 B2
(45) Date of Patent: Jan. 5, 2010

(54) INK COMPOSITION INCLUDING SURFACE MODIFIED COLORING AGENT

(75) Inventors: Jong-in Lee, Suwon-si (KR); Seung-min Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 637 days.

(21) Appl. No.: 11/340,669

(22) Filed: Jan. 27, 2006

(65) Prior Publication Data

US 2006/0169171 A1 Aug. 3, 2006

(30) Foreign Application Priority Data

Jan. 31, 2005 (KR) .................... 10-2005-0008751

(51) Int. Cl.
*C09D 11/00* (2006.01)

(52) U.S. Cl. ................ 106/31.27; 106/31.6; 106/31.58; 106/31.86

(58) Field of Classification Search .............. 106/31.27, 106/31.6, 31.58, 31.86
See application file for complete search history.

(56) References Cited

U.S. PATENT DOCUMENTS

| | | | |
|---|---|---|---|
| 5,728,206 A | 3/1998 | Badejo | |
| 5,741,356 A | 4/1998 | Badejo et al. | |
| 6,323,257 B1 * | 11/2001 | Moffatt et al. | 523/160 |
| 6,432,186 B1 | 8/2002 | Taniguchi | |
| 6,436,178 B1 * | 8/2002 | Hosmer | 106/31.46 |
| 6,494,943 B1 * | 12/2002 | Yu et al. | 106/31.65 |
| 2003/0024433 A1 * | 2/2003 | Yu | 106/31.6 |

FOREIGN PATENT DOCUMENTS

| | | |
|---|---|---|
| EP | 1 434 124 | 5/1976 |
| JP | 52-152422 | 12/1977 |
| JP | 62-1758 | 1/1987 |
| JP | 63-003066 | 1/1988 |
| JP | 9-165537 | 6/1997 |
| KR | 1998-80682 | 11/1998 |

* cited by examiner

*Primary Examiner*—Jerry Lorengo
*Assistant Examiner*—Veronica Faison Gee
(74) *Attorney, Agent, or Firm*—Stanzione & Kim LLP

(57) ABSTRACT

An ink composition includes a self-dispersible coloring agent that includes an ionic group and a non-ionic linear or cyclic ester or amide moiety on a surface of the coloring agent at a mole ratio of about 1:10 to about 10:1, an organic solvent, and water. The coloring agent has a modified surface, so that stability of the ink can be increased due to an interaction between the coloring agent and the organic solvent, the particle size of the coloring agent can be kept uniform, an adhering force with respect to a substrate is increased to minimize bleeding between colors of a printed image, waterfastness and rubfastness in dry and wet conditions are increased to obtain an excellent colorfastness, and resulting in a high quality printed image and an excellent storage stability.

15 Claims, No Drawings

INK COMPOSITION INCLUDING SURFACE MODIFIED COLORING AGENT

CROSS-REFERENCE TO RELATED APPLICATIONS

This application claims priority under 35 U.S.C. § 119 from Korean Patent Application No. 2005-8751, filed on Jan. 31, 2005, in the Korean Intellectual Property Office, the disclosure of which is incorporated herein by reference in its entirety.

BACKGROUND

1. Technical Field

The present general inventive concept relates to an ink composition, and more particularly, to an ink composition that includes a coloring agent with a modified surface to improve stability, thus having uniform particle size and stronger adhesion to paper.

2. Description of the Related Art

A coloring agent is generally defined as a material that exhibits a unique color by selectively absorbing or reflecting visible light. Coloring agents can be divided into dyes and pigments.

A dye is a coloring agent that is printed onto and absorbed by a material, such as fiber, leather, fur, paper, or the like, so that the printed material has excellent color fastness to solar cleaning, rubfastness, and the like. On the other hand, a pigment is a micro particle having a coloring agent, and is not directly absorbed by but rather adhered to a surface of a material using a physical method, such as adhesion or the like, so that the printed material has a unique color. At this time, the unique color of the coloring agent, such as a pigment or a dye, corresponds to a portion of the visible light of 3000 to 7000 Å selectively reflected or absorbed by the coloring agent.

In a method of manufacturing a pigment-type ink, a pigment including a coloring agent must be dispersed in a solvent. As a result, the dispersion of the pigment is mainly dependent on a size distribution and distribution stability of the pigment particles. In addition, in order to prolong a shelf life span of the pigment-type ink, aggregation or precipitation of the pigment particles must be prevented over a long time and under varying ambient conditions, such as temperature.

Typically, a pigment-type black ink contains carbon black as the coloring agent. The carbon black can be dispersed in an ink solvent using a dispersing agent. U.S. Pat. No. 3,687,887 discloses a method of dispersing carbon black in a solvent using a stylene-maleic acid anhydride copolymer, and U.S. Pat. No. 4,697,794 discloses a method of dispersing carbon black in a solvent using a hydrophilic polymer dispersing agent including an ionic group, such as carboxylic acid, sulfonic acid, sulfate, and the like.

The carbon black can also be dispersed using a commercially available dispersing agent, which can be easily obtained. However, when a water-soluble dispersing agent is used to disperse the carbon black pigment in a water-soluble medium, an excessive amount of the water-soluble dispersing agent is required to effectively disperse the pigment, because the water-soluble dispersing agent is physically adsorbed to a surface of the carbon black. The amount of water-soluble dispersing agent needed is comparable to the amount of pigment to be dispersed, and results in poor dispersion efficiency. Also, even though the dispersing agent is bound to the pigment, the bonding is ineffective and unstable, and thus, stable dispersion cannot be obtained. As a result, ink including the dispersing agent cannot be stored for a long time, and the aggregation or precipitation of non-soluble particles may occur in the ink.

A block copolymer and a graft copolymer can be used as a dispersing agent. In this case, however, manufacturing costs are high. When a common surfactant is used, excessive bubbles can be generated in a dispersing operation.

In order to overcome these problems resulting from the use of the dispersing agent and the surfactant, the surface of the carbon black can be modified for dispersion. According to U.S. Pat. Nos. 5,630,868 and 5,672,198, the carbon black pigment can be transformed into a self-dispersible coloring agent by introducing an ionic group to the surface of the carbon black thorough a reaction between the carbon black pigment and a diazonium salt. In order to produce a self-dispersible coloring agent for an ink composition, in particular, a self-dispersible pigment, a cation group, such as a tertiary ammonium group (—NR3+), a tertiary phosphonium group (—PR3+) and a tertiary sulfonium group (—SR2+) where R is a C1-C10 alkyl group or a hydrogen atom can be bound to the surface of the carbon black. The self-dispersible coloring agent can also be made by introducing an anionic component, such as —COOM, —SO3M, —SO2NH2, —PO3HM, —PO3M2 where M is a hydrogen atom, an alkali metal, ammonium, and an organic ammonium, to the surface of the carbon black (U.S. Pat. Nos. 5,630,868 and 5,672,198).

Examples of commercially available self-dispersing pigments include pigments obtained from CABOT Inc. and Orient Inc.

An ink composition using a self-dispersible coloring agent has excellent dispersing properties without needing a dispersing agent, due to the ionic group of the self-dispersible coloring agent. However, the water resistance of the ink composition is decreased due to its high ionic properties with respect to water. In order to overcome this problem, a non-ionic group can be included in the ink composition in addition to the ionic group.

SUMMARY

The present general inventive concept provides an ink composition that includes an ionic group and a non-ionic group on a surface of a coloring agent at an optimum ratio to improve water resistance and colorfastness, such as bleeding resistance and rubfastness, thus improving a printed image and long-term storage stability of the ink composition.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an ink composition including a self-dispersible coloring agent that includes an ionic group (A) and a non-ionic, linear or cyclic, ester or amide moiety (B), on the surface of the coloring agent at a mole ratio of about 1:10 to about 10:1, an organic solvent, and water.

The foregoing and/or other aspects of the present general inventive concept may also be achieved by providing an ink composition including a self-dispersible coloring agent that includes an ionic group (A) and a non-ionic group (B) on the surface of the coloring agent at a mole ratio about 1:10 to about 10:1, an organic solvent, and a liquid vehicle. The non-ionic group (B) may be a linear or cyclic ester or amide moiety. Furthermore, the liquid vehicle may be water.

The foregoing and/or other aspects of the present general inventive concept may also be achieved by providing an ink composition including a self-dispersible coloring agent having the formula

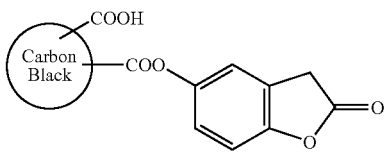

in which a mole ratio on the surface of the coloring agent of the ionic —COOH groups to the non-ionic lactone groups is about 1:10 to about 10:1.

The foregoing and/or other aspects of the present general inventive concept may be achieved by providing a method of controlling an amount of non-ionic groups at a surface of a self-dispersible coloring agent in an ink composition, the method including reacting one or more ionic groups on the surface of the coloring agent with one or more of the non-ionic groups, and controlling a mole ratio of the one or more ionic groups to the one or more non-ionic groups on the surface of the coloring agent to be about 10:1 to about 1:10 by controlling the mole ratio of the one or more non-ionic groups reacted with the coloring agent. The one or more ionic groups may include —COOH. The one or more non-ionic groups may include a non-ionic linear or cyclic ester or amide moiety.

The foregoing and/or other aspects of the present general inventive concept may also be achieved by providing a method of making an ink composition, the method including mixing together a self-dispersible coloring agent that includes an ionic group (A) and a non-ionic group (B) on a surface of the coloring agent at a mole ratio of about 1:10 to about 10:1, an organic solvent, and water to form a homogenous mixture. The non-ionic group (B) may be a non-ionic linear or cyclic ester or amide moiety.

DETAILED DESCRIPTION OF EMBODIMENTS

An ink composition according to an embodiment of the present general inventive concept includes water, a self-dispersible coloring agent that includes an ionic group and a non-ionic linear or cyclic ester or amide moiety on a surface of the coloring agent at a mole ratio of 1:10 to 10:1 to have the surface modified, and an organic solvent.

The ionic group may be, but is not limited to, a cationic group, such as a tertiary ammonium group (—$NR_3^+$), a tertiary phosphonium group (—$PR_3^+$) and a tertiary sulfonium group (—$SR_2^+$) where R is a C1-C10 alkyl group or a hydrogen atom, or an anionic component, such as —COOM, —$SO_3$M, —$SO_2NH_2$, —$PO_3$HM, —$PO_3M_2$ where M is a hydrogen atom, an alkali metal, ammonium, and an organic ammonium.

The non-ionic ester or amide moiety can bind the ink composition to a substrate, such as paper and the like, so that the adhesive force of the ink composition can be increased. The moiety may be a cyclic ester moiety, such as a C3-C10 lactone; a cyclic amide moiety, such as a C3-C10 lactam; a linear ester moiety, such as —C(=O)OR where R is a C1-C10 alkyl group, a C6-C20 aryl group, or the like; or a linear amide moiety, such as —C(=O)NR where R is a C1-C10 alkyl group, a C6-C20 aryl group, or the like. An ink composition including a coloring agent that includes both a non-ionic group and an ionic group has better water resistance than an ink composition including a coloring agent that includes the ionic group only. In addition, the ink composition including the coloring agent that includes both the non-ionic group and the ionic group can be easily attached to paper to obtain excellent rubfastness and can minimize bleeding between colors to increase durability of a printed image.

An amount of the non-ionic linear or cyclic ester moiety at the surface of the self-dispersible coloring agent can be controlled by, for example, the following operations.

First, —COOH can be introduced to the surface of the coloring agent through a reaction between carbon black and sodium hypochlorite (NaOCl). Then, the introduced —COOH (on the surface of the coloring agent) reacts with thionyl halide. As a result, the thionyl halide is attached to the surface of the coloring agent, which corresponds to a method disclosed in U.S. Pat. No. 6,402,825.

The coloring agent now having the thionyl halide, which is highly reactive, attached to its surface reacts with a non-ionic linear or cyclic ester moiety having —OH or NH2, thus producing a coloring agent according to an embodiment of the present general inventive concept.

The mole ratio of the ionic groups to the non-ionic groups attached to the surface of the coloring agent can be determined by analyzing a completely dried solution of the coloring agent using UV spectroscopy.

The above reactions will now be described in detail.

As illustrated in Reaction Scheme 1, —COOH groups on the surface of the carbon black react with thionyl chloride in a basic condition, so that many —C(=O)Cl molecules are attached to the surface of the carbon black.

As illustrated in Reaction Scheme 2, the product of Reaction Scheme 1 reacts with 2,5-dihydroxyphenylacetic-?-lactone, so that a compound having the lactone group is bound to the surface of the carbon black through the —COOH groups that were originally on the surface of the carbon black before Reaction Schemes 1 and 2. Through Reaction Schemes 1 and 2, the ionic surface of the carbon black is changed into a non-ionic surface. In other words, through Reaction Schemes 1 and 2, the ionic groups attached to the surface of the carbon black are replaced by the non-ionic linear or cyclic ester or amide moieties having —OH or NH2, such as the lactone groups discussed above. The mole ratio of the ionic groups to the non-ionic groups on the surface of the carbon black can be controlled by controlling the mole ratio of the compound containing the lactone group to the carbon black in Reaction Scheme 2.

[Reaction Scheme 1]

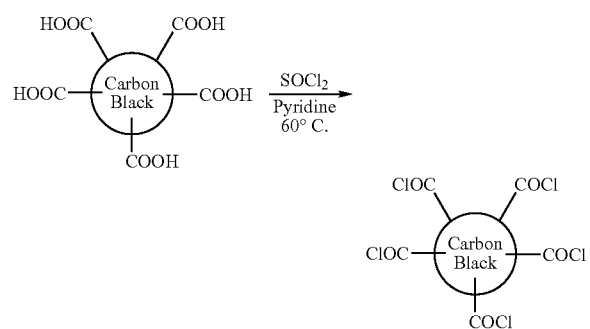

-continued
[Reaction Scheme 2]

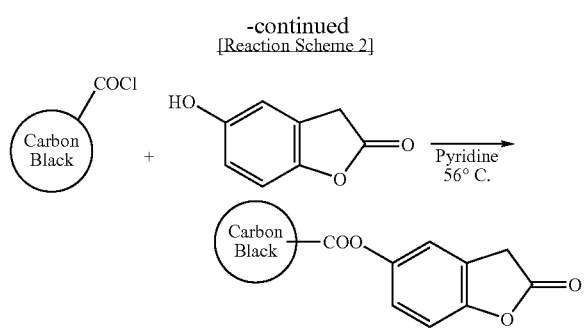

A coloring agent obtained through Reaction Schemes 1 and 2 may be a compound represented by

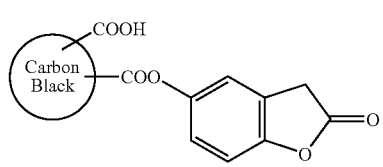

(1)

In the compound represented by formula 1, the mole ratio of the ionic group, such as —COOH, to the non-ionic group, such as the lactone group, may be in the range of about 1:10 to about 10:1. For example, the mole ratio of the ionic group, such as —COOH, to the non-ionic group, such as the lactone group, may be in the range of about 3:8 to about 9:1, such as 6.8:1, 4.8;1, or 8.8:1.

As discussed above, the mole ratio of the ionic group to the non-ionic linear or cyclic ester moiety on the surface of the coloring agent may be about 1:10 to about 10:1. For example, the mole ratio may be about 3:8 to about 9:1. When the mole ratio is greater than about 10, an electrostatic repulsive force of the self-dispersible coloring agent is decreased and the storage capacity of the ink composition deteriorates. When the mole ratio is less than about 0.1, an image that is printed using the ink composition containing the coloring agent has poor water resistance and the adhesive force of the ink composition onto paper is decreased.

When the surface of the coloring agent of the ink composition has only ionic groups thereon, water ($H_3O^+$ ions) can easily access the coloring agent so that dispersion stability of the coloring agent in an aqueous ink solution is good. However, when the surface of the coloring agent of the ink composition has non-ionic groups thereon, less interaction between the coloring agent and water ($H_3O^+$ ions) occurs, so that multiple coloring agents tend to combine together. Accordingly, an organic solvent is employed that contains a polar group and a non-polar group. The organic solvent is dissolvable in water and enhances the interactions of water with the coloring agent having the non-ionic groups attached to its surface. The amount of the organic solvent may be 20 times the amount of the coloring agent or less. The organic solvent can increase the wettability of the surface of the coloring agent and the storage stability of the coloring agent. The non-ionic group of the organic solvent may be, but is not limited to, a linear or cyclic hydrocarbon or aryl group. The ionic group of the organic solvent may be, but is not limited to, a linear or cyclic ester or amid group or a hetero atom, such as a halogen atom, a hydroxyl group, a nitro group, an amine group, or the like. Furthermore, the coloring agent is not limited to containing only one organic solvent. In other words, one or more organic solvents can be used.

The organic solvent may be, but is not limited to, alcohol compounds, such as methylalcohol, ethylalcohol, n-propylalcohol, isopropylalcohol, n-butylalcohol, sec-butylalcohol, t-butylalcohol and isobutylalcohol; polyhydric alcohol compounds, such as 1,6-hexanediol, 1,2-hexanediol, ethylene glycol, diethyleneglycol, triethyleneglycol, propyleneglycol, butyleneglycol, 1,4-butanediol, 1,2,4-butanetriol, 1,5-pentanediol, 1,2,6-hexanetriol, trimethanolpropane, hexyleneglycol, glycerol, poly(ethylene glycol) and the like; ketone compounds, such as acetone, methylethylketone, diacetonealcohol, and the like; ester compounds, such as an ethylacetate, ethyl lactate, and the like; lower alkyl ether compounds, such as ethyleneglycol monomethyl ether, ethyleneglycol monoethyl ether, diethyleneglycol methyl ether, diethyleneglycol ethyl ether, diethylene glycol monobutyl ether, diethylene glycol diethyl ether, triethylene glycol monomethyl ether, triethylene glycol monoethyl ether, and the like; dimethyl sulfoxide; tetramethylenesulfone; thioglycol; or the like.

The amide compound may be, but is not limited to, 2-pyrrolidone, 2-piperidone, N-methyl-pyrrolidone, caprolactam, tetrahydro-2-pyrimidone, 3-methyl-tetrahydro-2-pyrimidone, 2-imidazolidinone, dimethylimidazolidinone, diethylimidazolidinone, butyl urea, 1,3-dimethyl urea, ethyl urea, propyl urea, isopropyl urea, 1,3-diethyl urea, or the like.

The surfactant may be an ionic surfactant, a non-ionic surfactant, or the like, but is not limited thereto. The ionic surfactant may be a salt of alkylcarboxylic acid, a salt of alcohol sulfonic acid ester, a salt of alkylsulfonic acid, a salt of alkylbenzenesulfonic acid, a fatty acid amine salt, a tertiary ammonium salt, a sulfonium salt, a phosphonium salt, or the like. The non-ionic surfactant may be polyoxyethylene alkyl ether, polyoxyethylene alkyl phenyl ether, polyoxyethylene secondary alcohol ether, polyoxyethylene-oxypropylene block copolymer, polyglycerine fatty acid ester, sorbitan monoester alkoxylate, acetylenic polyalkylene oxide, acetylenic diol, or the like.

The amount of the organic solvent may be in the range of about 1 to about 20 parts by weight based on 1 part by weight of the coloring agent. When the amount of the organic solvent is less than about 1 part by weight based on 1 part by weight of the coloring agent, sufficient wettability and storage stability cannot be obtained. When the amount of the organic solvent is greater than about 20 parts by weight based on 1 part by weight of the coloring agent, the viscosity of the ink increases and the particle size increases rapidly.

The amount of water may be in the range of about 1 to about 30 parts by weight based on 1 part by weight of the coloring agent. When the amount of water is less than about 1 part by weight based on 1 part by weight of the coloring agent, the density of the coloring agent in the ink composition increases, and thus the viscosity of the ink composition increases. When the amount of water is greater than about 30 parts by weight based on 1 part by weight of the coloring agent, colors cannot be formed. Although water is used above as a liquid vehicle for the ink composition, the liquid vehicle is not limited to being water. Suitable components for the liquid vehicle include, but are not limited to, water, ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, other water-soluble or water-miscible materials, mixtures thereof, and the like. The liquid vehicle can consist solely of water, or it can comprise a mixture of water and a water-soluble or water-miscible organic component.

The ink composition may further include an additive, such as a viscosity controller, a wetting agent, a dispersing agent, a pH controlling agent, an anti-oxidizing agent, and other agents conventionally included in an ink composition.

The ink composition may further include an acid or a base. The acid or the base increases the solubility of the organic solvent and stabilizes the coloring agent.

A method of forming an ink composition according to embodiments of the present general inventive concept will now be described.

First, the self-dispersible coloring agent (for example, a self-dispersible pigment), the organic solvent, and the like are added to water, and then the mixture is mixed to obtain a homogenous solution.

The homogenous solution is then filtered, for example through a filter paper, such as a 0.45 μm filter paper, to prepare the ink composition.

The ink composition may have a surface tension of 15 to 70 dyne/cm and a viscosity of 1.0 to 20 cP at 20° C. In addition, when the ink composition is left to sit at room temperature for one month, the particle size of the coloring agent may increase by about 3 times or less. For example, the particle size of the coloring agent may increase by about 1.01 to 3 times.

The term 'the particle size' indicates the average diameter of the particles of the coloring agent.

The ink composition can be used as, but is not limited to being used as, a toner composition, various paints, a coating solution, or the like.

The present general inventive concept will be described in further detail with reference to the following examples. These examples are for illustrative purposes only and are not intended to limit the scope of the present general inventive concept.

EXAMPLES

The following self-dispersible pigments were used as examples:

Self-dispersible Pigments—Examples

S-Pigment 1: Linejet Black SP-1, manufactured by Samsung Co., Ltd.
S-Pigment 2: Linejet Black SP-2, manufactured by Samsung Co., Ltd.
S-Pigment 3: Linejet Black SP-3, manufactured by Samsung Co., Ltd.
S-Pigment 4: Linejet Black SP-4, manufactured by Samsung Co., Ltd.
S-Pigment 5: Linejet Black SP-5, manufactured by Samsung Co., Ltd.

The following self-dispersible pigments were used as comparative examples:

Self-dispersible Pigments—Comparative Examples

S-Pigment 6: Linejet Black SP-6, manufactured by Samsung Co., Ltd.
S-Pigment 7: Linejet Black SP-7, manufactured by Samsung Co., Ltd.
S-Pigment 8: Linejet Black SP-8, manufactured by Samsung Co., Ltd.
S-Pigment 9: Linejet Black SP-9, manufactured by Samsung Co., Ltd.
S-Pigment 10: Linejet Black SP-10, manufactured by Samsung Co., Ltd.

The surfaces of the above self-dispersible pigments were analyzed using an indrared spectrometer. From the result, the mole ratios of the ionic groups to the non-ionic groups on the surface of the pigments were determined using area ratios obtained by integrating the peaks of the ionic groups and the non-ionic groups.

TABLE 1

|  | Ionic Group (mol) | Non-ionic | Ionic group/ Non-ionic |
| --- | --- | --- | --- |
| S-Pigment 2 | 12.4 | 3.7 | 3.4 |
| S-Pigment 3 | 16.3 | 2.4 | 6.8 |
| S-Pigment 4 | 13.4 | 2.8 | 4.8 |
| S-Pigment 5 | 14.7 | 1.7 | 8.8 |
| S-Pigment 6 | 1.4 | 15.6 | 0.09 |
| S-Pigment 7 | 13.1 | 1.2 | 10.9 |
| S-Pigment 9 | 15.8 | 0.4 | 39.5 |
| S-Pigment 10 | 13.1 | 0.6 | 21.8 |

Organic Solvent
  EG: Ethylene Glycol
  DEG: Diethylene Glycol
  Gly: Glycerine
  1,2,6-hex: 1,2,6-hexanetriol
  DEGMBE: Diethyleneglycol Monobutyl Ether Amide Compound
  2-P: 2-pyrrolidone
  NMP: N-methyl-2-pyrrolidone
  Cyclo-P: Cyclohexyl pyrrolidone
  C-lactam: Caprolactam
  V-lactam: Valerolactam Surfactant
  Surfactant 1: Disperbyk-181 obtained from BYK Inc.
  Surfactant 2: Surfynol 465 obtained from Air Product Inc.
  Surfactant 3: Tergitol obtained from ICI Inc.
  Surfactant 4: Pluronics obtained from BASF Inc.
  Surfactant 5: sodium dicyclohexyl sulfosuccinate obtained from CYTEC Inc.

Samples of the Ink compositions including the above self-dispersible pigments and organic solvents were manufactured by following operations.

For the respective ink compositions of the samples in the following Table 2, organic solvents that are suitable for ink characteristics in accordance with the composition described in the Table 2 were added to a 250 ml beaker. Then, water was added to bring the resulting solution to 100 g. The mixture was then mixed at 700 rpm for 30 minutes or more to obtain a homogenous solution, which was filtered using a 0.45 μm filter paper, thus producing a final ink composition.

TABLE 2

| Sample Name | Coloring Agent (parts by weight) | Organic Solvent Mixtures (parts by weight) |
| --- | --- | --- |
| Example 1 | S-Pigment 1, (4) | EG (8), DEC (6), surfactant 1 (0.5) |
| Example 2 | S-Pigment 2, (4) | Gly (10), DEGMBE (8), NMP (5) |
| Example 3 | S-Pigment 3, (4) | 1,2,6-Hex (10), Cyclo-P (8) |

TABLE 2-continued

| Sample Name | Coloring Agent (parts by weight) | Organic Solvent Mixtures (parts by weight) |
|---|---|---|
| Example 4 | S-Pigment 4, (5) | C-lactam (4), surfactant 4 (0.6) |
| Example 5 | S-Pigment 5, (5) | DEG (6), V-lactam (7), surfactant 5 (0.7) |
| Comparative Example 1 | S-Pigment 6, (4) | EG (6), 2-P (5), surfactant 5 (0.5) |
| Comparative Example 2 | S-Pigment 7, (4) | Gly (10), DEGMBE (2), NMP (7), surfactant 2 (0.8) |
| Comparative Example 3 | S-Pigment 8, (4) | 1,2,6-Hex (10), DEG (6), Cyclo-P (6), surfactant 4 (1.0) |
| Comparative Example 4 | S-Pigment 9, (5) | Gly (12), C-lactam (4) |
| Comparative Example 5 | S-Pigment 10, (5) | EG (8), V-lactam (7), surfactant 3 (0.7) |

The physical properties of the ink compositions shown in Table 2 are shown in Tables 3 and 4.

TABLE 3

| | Example 1 | Example 2 | Example 3 | Example 4 | Example 5 |
|---|---|---|---|---|---|
| pH | 7.2 | 7.4 | 7.1 | 7.3 | 7.9 |
| Viscosity (cP) | 2.1 | 2.8 | 3.1 | 2.4 | 2.7 |
| Surface Tension (dyne/cm) | 35.8 | 40.6 | 43.2 | 39.8 | 28.7 |
| Particle size (μm) | 0.136 | 0.124 | 0.148 | 0.167 | 0.095 |

TABLE 4

| | Comparative Example 1 | Comparative Example 2 | Comparative Example 3 | Comparative Example 4 | Comparative Example 5 |
|---|---|---|---|---|---|
| pH | 7.2 | 7.3 | 7 | 7.5 | 7.7 |
| Viscosity (cP) | 2.3 | 2.5 | 2.8 | 2.6 | 2.4 |
| Surface Tension (dyne/cm) | 35.9 | 42.6 | 42.3 | 40.3 | 26.3 |
| Particle size (μm) | 0.116 | 0.143 | 0.136 | 0.089 | 0.175 |

Experimental Example 1

Change of Size of Particle 100 ml of each of the respective ink compositions of Examples 1 through 5 and Comparative Examples 1 through 5 were added to glass bottles, which were sealed and left to sit in a constant-temperature container of 25° C. for one month. The changes in the particle sizes were measured and denoted by the following signs according to the rate of change in size. The results are shown in Table 5.

A=size of particle after the ink composition was left to sit at a constant temperature for one month/size of particle before the ink composition was left to sit at a constant temperature for one month.

⊚: A<2,
○: 2≦A<3
X: 3≦A<4
XX: A>4

Experimental Example 2

Storage Stability 100 ml of each of the ink compositions of Examples 1 through 5 and Comparative Examples 1 through 5 were added to heat-resistance glass bottles, which were sealed and left to sit in a constant-temperature container at 60° C. for two months. Then, precipitation and layer separation were observed. The results are shown in Table 5.

○: Non precipitation+No layer separation
Δ: Non precipitation+layer separation
x: precipitation Experimental Example 3

Test for Nozzle Clogging

Ink compositions according to Examples 1 through 5 and Comparative Example 1 through 5 were placed in ink cartridges obtained from Samsung Co., Ltd. for two weeks at 25° C. and two weeks at −5° C. Subsequently, the ink cartridges were used for printing, and nozzle clogging was observed. The results are shown in Table 5.

⊚: 5% or less of conventional nozzles were clogged.
○: 6~10% of conventional nozzles were clogged.
X: 11~20% of conventional nozzles were clogged.
XX: 21% or greater of conventional nozzles were clogged.

Experimental Example 4

Rubfastness Test

Ink cartridges (M-50, obtained from Samsung Co., Ltd.) were refilled with ink compositions according to Examples 1 through 5 and Comparative Examples 1 through 5, and then placed in a printer (MJC-2400C manufactured by Samsung Co., Ltd.) to print a bar image (2×10 cm). The printed bar image was dried for 24 hours, and then rubbed 5 times using a testing apparatus. The OD (optical density) of a transferred image of the bar was compared to the OD of the original bar image before the rubbing (in percent). The results are shown in Table 5.

A=(OD of transferred image/OD of original bar image)×100(%)
⊚: A<10
○: 10≦A<20
X: 20≦A<30
XX: A>30

Experimental Example 5

Waterfastness Test

Ink cartridges (M-50, obtained from Samsung Co., Ltd.) were refilled with ink compositions according to Examples 1 through 5 and Comparative Examples 1 through 5, and then placed in a printer (MJC-2400C manufactured by Samsung Co., Ltd.) to print a bar image (2×10 cm). After 5 minutes, 5 drops of water were added to the printed bar image, and then the bar image was dried for 24 hours. Then, the OD of the image after the addition of water was compared to the OD of the original image (in percent.) The results are shown in Table 5.

A=(OD of the image after the addition of water/OD of original bar image)×100(%)

⊚: 95≦A
○: 90≦A<95,
X: 85≦A<90
XX: A<85

Experimental Example 6

Bleeding Resistance Test

Ink cartridges (M-50, obtained from Samsung Co., Ltd.) were refilled with ink compositions according to Examples 1 through 5 and Comparative Examples 1 through 5. The ink cartridges and a color ink (C-60 obtained from Samsung Co., Ltd.) were placed in a printer (MJC-2400C manufactured by Samsung Co., Ltd.) to print a test pattern. After 30 minutes, dot lines at the boundary of adjacent colors where color mixing occurred were measured using microscopy (standard: refer to U.S. Pat. No. 5,854,307).

The degree of bleeding was scaled as follows:

5: No color mixing over the entire boundary;
4: Color mixing occurred in an area corresponding to the diameter of 1 dot;
3: Color mixing occurred in an area corresponding to the diameter of 2 dots;
2: Color mixing occurred in an area corresponding to the diameter of 3 dots; and
1: Color mixing occurred in an area corresponding to the diameter of 4 dots or more
(the diameter of 1 dot is 100 μm when 600 dpi is a standard.)

ing to embodiments of the present general inventive concept can be used as inkjet ink and printing ink for painting, textile printing, paper manufacturing, cosmetics, ceramics, and the like.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition comprising:
   a self-dispersible coloring agent that includes an ionic group (A) and a non-ionic linear or cyclic ester, or a non-ionic cyclic amide moiety (B) on a surface of the coloring agent at a mole ratio of about 1:10 to about 10:1;
   an organic solvent; and
   water,
   wherein the ionic group (A) is at least one compound selected from the group consisting of a tertiary ammonium group ($-NR^{3+}$), a tertiary phosphonium group ($-PR^{3+}$), a tertiary sulfonium group ($-SR_2^+$) where R is a C1-C10 alkyl group or a hydrogen atom, $-COOH$, $-SO_3H$, $-PO_3H_2$, $-SO_2NH_2$, $-COOM$, $-SO_3M$, $-PO_3HM$, and $-PO_3M_2$ where M is a hydrogen atom, an alkali metal, ammonium, or an organic ammonium, and
   wherein the non-ionic moiety (B) comprises non-ionic linear or cyclic ester, or a non-ionic cyclic amide moiety selected from the group consisting of C3-C10 lactone,

TABLE 5

|  | Change of Particle Size | Storage Stability | Nozzle Clogging | Rubfastness | Waterfastness | Bleeding Resistance |
|---|---|---|---|---|---|---|
| Example1 | ○ | ○ | ⊚ | ⊚ | ○ | 5 |
| Example2 | ⊚ | ○ | ⊚ | ○ | ⊚ | 5 |
| Example3 | ⊚ | ○ | ○ | ⊚ | ○ | 5 |
| Example4 | ○ | ○ | ⊚ | ⊚ | ⊚ | 5 |
| Example5 | ⊚ | ○ | ○ | ⊚ | ⊚ | 4 |
| Comparative Example1 | XX | X | ○ | X | ○ | 3 |
| Comparative Example2 | ⊚ | Δ | X | XX | X | 2 |
| Comparative Example3 | XX | X | ⊚ | ○ | X | 3 |
| Comparative Example4 | X | Δ | X | XX | ○ | 3 |
| Comparative Example5 | Δ | Δ | X | ○ | X | 4 |

An ink composition including an organic solvent and a coloring agent that contains an ionic group and a non-ionic group on the surface of the coloring agent at an optimum ratio according to the present general inventive concept has many advantages. For example, a uniform particle size of the coloring agent can be maintained, and the storage stability of the ink composition can be improved. In addition, bleeding between colors of a printed image can be minimized by decreasing the fluidity of the coloring agent in an ink drop discharged on paper and by increasing an adhesive force with respect to a substrate. In addition, the water resistance of the printed image and the rubfastness in dry and wet conditions are improved to produce excellent colorfastness. Further, the quality of the printed image is improved and long-term storage stability is good. Accordingly, ink compositions accord- C3-C10 lactam, and $-C(=O)OR$ where R is a C1-C10 alkyl group or a C6-C20 aryl group.

2. The ink composition of claim 1, wherein the mole ratio is about 3:8 to about 9:1.

3. The ink composition of claim 1, wherein the organic solvent is a co-solvent comprising at least one compound selected from the group consisting of methylalcohol, ethylalcohol, n-propylalcohol, isopropylalcohol, n-butylalcohol, sec-butylalcohol, t-butylalcohol, isobutylalcohol, 1,6-hexanediol, 1,2-hexanediol, ethylene glycol, diethyleneglycol, triethyleneglycol, propyleneglycol, butyleneglycol, 1,4-butanediol, 1,2,4-butanetriol, 1,5-pentanediol, 1,2,6-hexanetriol, trimethanolpropane, hexyleneglycol, glycerol, poly (ethylene glycol), acetone, methylethylketone, diacetonealcohol, ethylacetate, ethyl lactate, ethyleneglycol monomethyl ether, ethyleneglycol monoethyl ether, diethyleneglycol methyl ether, diethyleneglycol ethyl ether, diethylene glycol monobutyl ether, diethylene glycol diethyl ether, triethylene glycol monomethyl ether, triethylene glycol monoethyl ether, dimethyl sulfoxide, tetramethylenesulfone, and thioglycol.

4. The ink composition of claim 1, wherein the organic solvent is an amide compound comprising at least one compound selected from the group consisting of 2-pyrrolidone, 2-piperidone, N-methyl-pyrrolidone, caprolactam, tetrahydro-2-pyrimidone, 3-methyl-tetrahydro-2-pyrimidone, 2-imidazolidinone, dimethylimidazolidinone, diethylimidazolidinone, butyl urea, 1,3-dimethyl urea, ethyl urea, propyl urea, isopropyl urea, and 1,3-diethyl urea.

5. The ink composition of claim 1, wherein:
the organic solvent is one of an ionic surfactant and a non-ionic surfactant;
the ionic surfactant is selected from the group consisting of a salt of alkylcarboxylic acid, a salt of alcohol sulfonic acid ester, a salt of alkylsulfonic acid, a salt of alkylbenzenesulfonic acid, a fatty acid amine salt, a tertiary ammonium salt, a sulfonium salt, and a phosphonium salt; and
the non-ionic surfactant is selected from the group consisting of polyoxyethylene alkyl ether, polyoxyethylene alkyl phenyl ether, polyoxyethylene secondary alcohol ether, polyoxyethylene-oxypropylene block copolymer, polyglyceine fatty acid ester, sorbitan monoester alkoxylate, acetylenic polyalkylene oxide, and acetylenic diol.

6. The ink composition of claim 1, wherein an amount of the organic solvent in the ink composition is in a range of about 1 to about 20 parts by weight based on 1 part by weight of the self-dispersible coloring agent.

7. The ink composition of claim 1, wherein an amount of the water in the ink composition is in a range of about 1 to about 30 parts by weight based on 1 part by weight of the self-dispersible coloring agent.

8. The ink composition of claim 1, wherein the ink composition has a surface tension of about 15 to about 70 dyne/cm and a viscosity of about 1 to about 20 cP at 20° C.

9. The ink composition of claim 1, wherein a particle size of the coloring agent when the ink composition is left to sit at room temperature for at least about one month is less than or equal to 3 times an original particle size of the coloring agent before it is left to sit at the room temperature for one month.

10. An ink composition comprising a self-dispersible coloring agent having the formula

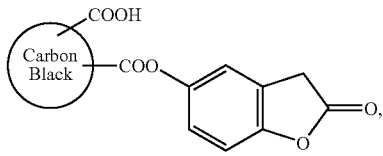

wherein a mole ratio of the ionic —COOH groups to the non-ionic lactone groups on a surface of the coloring agent is about 1:10 to about 10:1.

11. A method of controlling an amount of non-ionic groups at a surface of a self-dispersible coloring agent of an ink composition, comprising:
reacting one or more ionic groups on the surface of the coloring agent with one or more of the non-ionic groups; and
controlling the mole ratio of the one or more ionic groups to the one or more non-ionic groups on the surface of the coloring agent to be about 10:1 to about 1:10 by controlling the mole ratio of the one or more non-ionic groups reacted with the coloring agent,
wherein the ionic group is at least one compound selected from the group consisting of a tertiary ammonium group ($-NR^{3+}$), a tertiary phosphonium group ($-PR^{3+}$), a tertiary sulfonium group ($-SR_2^+$) where R is a C1-C10 alkyl group or a hydrogen atom, —COOH, —SO$_3$H, —PO$_3$H$_2$, —SO$_2$NH$_2$, —COOM, —SO$_3$M, —PO$_3$HM, and —PO$_3$M$_2$ where M is a hydrogen atom, an alkali metal, ammonium, or an organic ammonium, and
wherein the non-ionic group comprises non-ionic linear or cyclic ester, or a non-ionic cyclic amide moiety selected from the group consisting of C3-C10 lactone, C3-C10 lactam, and —C(=O)OR where R is a C1-C10 alkyl group or a C6-C20 aryl group.

12. The method of claim 11, wherein the one or more ionic groups comprises —COOH.

13. The method of claim 11, wherein the one or more non-ionic groups comprises a non-ionic linear or cyclic ester or non-ionic cyclic amide moiety.

14. A method of making an ink composition, comprising:
mixing together a self-dispersible coloring agent that includes an ionic group (A) and a non-ionic group (B) on a surface of the coloring agent at a mole ratio of about 1:10 to about 10:1, an organic solvent, and water to form a homogenous mixture,
wherein the ionic group (A) is at least one compound selected from the group consisting of a tertiary ammonium group ($-NR^{3+}$), a tertiary phosphonium group ($-PR^{3+}$), a tertiary sulfonium group ($-SR_2^+$) where R is a C1-C10 alkyl group or a hydrogen atom, —COOH, —SO$_3$H, —PO$_3$H$_2$, —SO$_2$NH$_2$, —COOM, —SO$_3$M, —PO$_3$HM, and —PO$_3$M$_2$ where M is a hydrogen atom, an alkali metal, ammonium, or an organic ammonium, and
wherein the non-ionic group (B) comprises non-ionic linear or cyclic ester, or a non-ionic cyclic amide moiety selected from the group consisting of C3-C10 lactone, C3-C10 lactam, and —C(=O)OR where R is a C1-C10 alkyl group or a C6-C20 aryl group.

15. The method of claim 14, wherein the non-ionic group (B) is a non-ionic linear or cyclic ester or non-ionic cyclic amide moiety.

* * * * *

UNITED STATES PATENT AND TRADEMARK OFFICE
CERTIFICATE OF CORRECTION

PATENT NO. : 7,641,722 B2 Page 1 of 1
APPLICATION NO. : 11/340669
DATED : January 5, 2010
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Twenty-first Day of December, 2010

David J. Kappos
*Director of the United States Patent and Trademark Office*